Patented Nov. 5, 1946

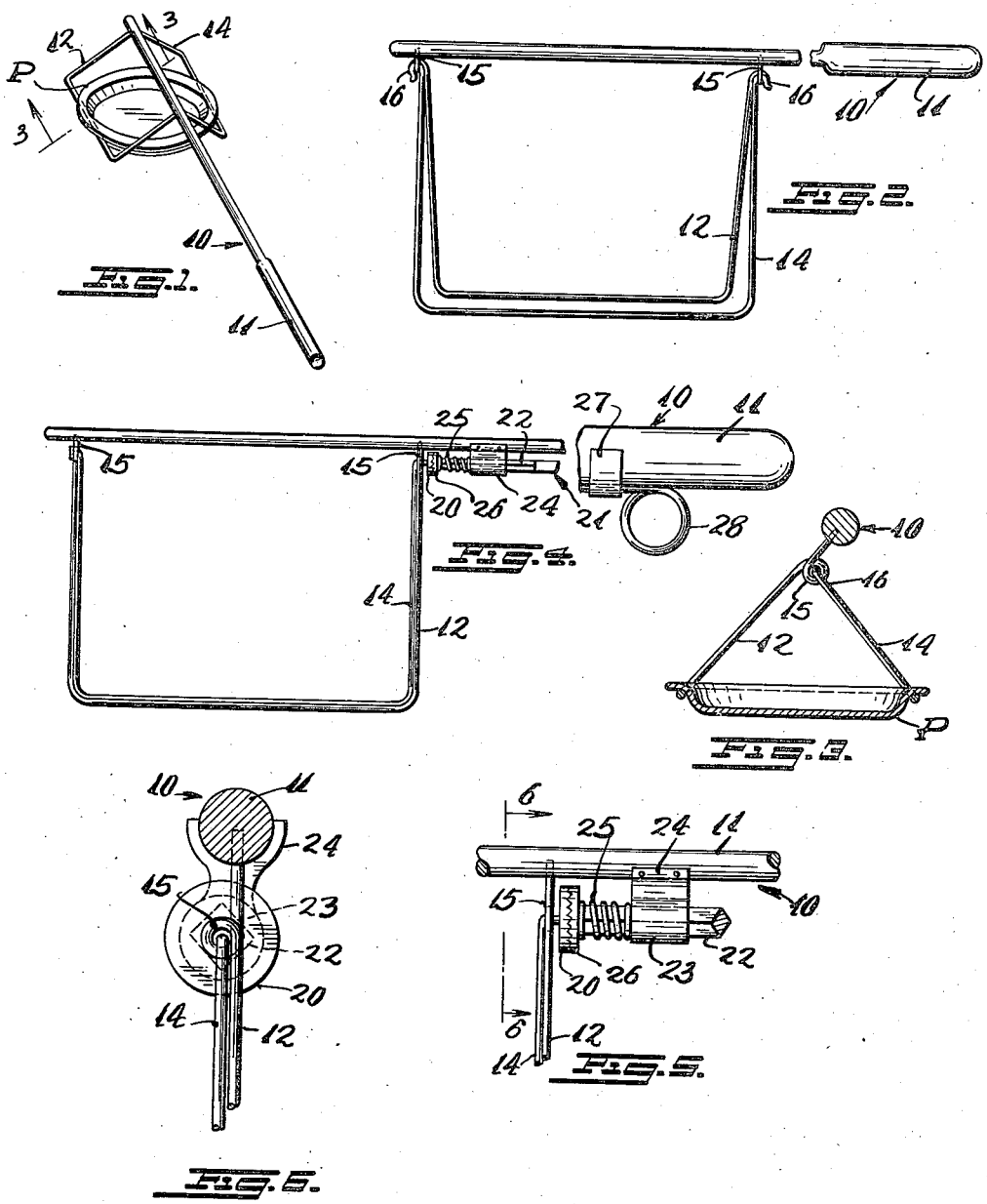

2,410,655

UNITED STATES PATENT OFFICE 2,410,655

SAFETY PIEPAN LIFTER

Homer Henrichon, New York, N. Y.

Application April 24, 1945, Serial No. 590,066

4 Claims. (Cl. 294—30)

This invention relates to new and useful improvements in pie pan lifters, and has more particular reference to a safety pie pan lifter.

More particularly, the invention proposes a new and improved pie pan lifter which is characterized by a rod having a handle at one end, and at its other end supporting a stationary U-shaped frame attached at the ends of its arms to said rod. A movable U-shaped frame is pivotally associated with the ends of the arms of said stationary frame by which it is possible to separate the frames in jaw-like fashion to engage the opposite sides of the flange of a pie pan.

The invention contemplates a modified form in which means is associated with the moveable frame by which it may be locked in various pivoted positions in relation to the stationary frame.

Another object of the invention is the construction of a device as mentioned, which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of a safety pie pan lifter constructed in accordance with this invention.

Fig. 2 is a side elevational view of the pie pan lifter illustrated in Fig. 1.

Fig. 3 is a transverse vertical sectional view taken on the line 3—3 of Fig. 1.

Fig. 4 is a side elevational view of a safety pie pan lifter constructed according to a modified form of this invention.

Fig. 5 is a fragmentary enlarged detailed view of a portion of Fig. 4.

Fig. 6 is a transverse sectional view taken on the line 6—6 of Fig. 5.

The safety pie pan lifter, in accordance with that form of the invention illustrated in Figs. 1-3, includes a rod 10 having a handle portion 11 at one end supporting a stationary U-shaped frame 12. This U-shaped frame 12 is fixedly attached by the ends of its arms to the rod 10. A moveable U-shaped frame 14 is pivotally mounted by the ends of its arms to the ends of the arms of said stationary frame 12.

The stationary frame 12 is formed from a strand of wire. The side arms of the frame 12 have small coiled portions 15 located immediately adjacent the rod 10 and forming bearings through which the end portions 16 of the moveable frame 14 are hooked. The moveable frame 14 is also made from a strand of wire. The ends of the arms of the stationary frame 12 are driven into the side of the rod 10 for fixedly connecting the stationary frame with the rod 10.

The pie pan lifter is used, as follows:

It is held by the handle 11. The moveable U-shaped frame 14 is slipped over one side of a pie pan P. Then the rod 10 is turned and the stationary frame 12 is guided so that it slips over the other side of the pan P, and now the handle 11 may be lifted to lift the pie pan P.

In Figs. 4-6 a modified form of the invention has been disclosed which is very similar to the prior form, distinguishing by the fact that the inner end of the moveable U-shaped frame 14 is bent so as to extend through the adjacent loop 15 and so as to continue into a stem portion which supports a clutch disc 20. A rod 21 is slidably mounted along the bottom side of the rod 10. This rod 21 has a square section 22 which engages through a complementary square socket portion 23 of a support bracket 24 attached to the rod 10.

A spring 25 is coaxially mounted upon the square portion 22 and acts between the bracket 24 and a clutch disc 26 mounted upon the end of the square portion 22. This clutch disc 26 is complementary to and opposed to the clutch disc 20. The spring 25 urges the clutch disc 26 against the clutch disc 20 so as to hold the latter disc from turning. The rod 21 is supported by another bracket 27 near the handle portion 11 of the rod 10. At this latter end, the rod 20 is formed into a ring portion 28 adapted to receive one's finger.

In other respects this form of the invention is identical to the previous form and like parts are identified by like reference numerals.

The operation of this form of the invention is very similar to the prior form, except for the fact that while the handle 11 is being held, one finger may be engaged into the ring 28, and the rod 21 may be moved so that the clutch disc 26 releases the clutch disc 20. Now the moveable frame 14 is free and may be pivoted open, and may be engaged across one side of a pie pan. The stationary U-shaped frame 12 is then engaged over the other side of the pie pan.

The rod 21 is now released so that the spring 25 forces the clutch disc 26 against the clutch disc 20, locking the U-shaped frames 12 and 14 in fixed positions relative to each other. It is now safe to lift the pie pan without any danger of the frames 12 and 14 opening and dropping the pie pan.

While I have illustrated and described the preferred embodiments of my invention, it is to be understood that I do not limit myself to the precise constructions herein disclosed and the right is reserved to all changes and modifications coming with the scope of the invention as defined in the appended claims.

Having thus described my invention, what I claim as new, and desire to secure by United States Letters Patent is:

1. A safety pie pan lifter, comprising a rod having a handle at one end, a stationary U-shaped frame fixedly attached by the ends of its arms to the other end of said rod, a movable U-shaped frame pivotally mounted by the ends of its arms to the ends of the arms of said stationary frame, and means for locking said movable frame in various pivoted positions in relation to said stationary frame, including a rod slidably and non-rotatively mounted along said first named rod, opposed clutch discs on said rod and on one of the ends of said movable U-shaped frame, and resilient means urging said clutch discs together.

2. A safety pie pan lifter, comprising a rod having a handle at one end, a stationary U-shaped frame fixedly attached by the ends of its arms to the other end of said rod, a movable U-shaped frame pivotally mounted by the ends of its arms to the ends of the arms of said stationary frame, and means for locking said movable frame in various pivoted positions in relation to said stationary frame, including a rod slidably and non-rotatively mounted along said first named rod, opposed clutch discs on said rod and on one of the ends of said movable U-shaped frame, and resilient means urging said clutch discs together, said second named rod being provided with a ring portion at one end by which it may be moved.

3. A safety pie pan lifter, comprising a rod having a handle at one end, a stationary U-shaped frame fixedly attached by the ends of its arms to the other end of said rod, a movable U-shaped frame pivotally mounted by the ends of its arms to the ends of the arms of said stationary frame, and means for locking said movable frame in various pivoted positions in relation to said stationary frame, including a rod slidably and non-rotatively mounted along said first named rod, opposed clutch discs on said rod and on one of the ends of said moveable U-shaped frame, and resilient means urging said clutch discs together, said resilient means comprising a spring.

4. A safety pie pan lifter, comprising a rod having a handle at one end, a stationary U-shaped frame fixedly attached by the ends of its arms to the other end of said rod, a movable U-shaped frame pivotally mounted by the ends of its arms to the ends of the arms of said stationary frame, and means for locking said movable frame in various pivoted positions in relation to said stationary frame, including a rod slidably and non-rotatively mounted along said first named rod, opposed clutch discs on said rod and on one of the ends of said movable U-shaped frame, and resilient means urging said clutch discs together, said second named rod having a square portion engaging a square socket on a support bracket.

HOMER HENRICHON.